(12) United States Patent
Iwasaki et al.

(10) Patent No.: US 10,082,202 B2
(45) Date of Patent: Sep. 25, 2018

(54) AUTOMATIC TRANSMISSION

(71) Applicant: Mazda Motor Corporation, Aki-gun, Hiroshima (JP)

(72) Inventors: Tatsuhiko Iwasaki, Hiroshima (JP); Kensuke Ueda, Aki-gun (JP); Kazuhiro Yamada, Hatsukaichi (JP)

(73) Assignee: Mazda Motor Corporation, Aki-gun, Hiroshima (JP)

( * ) Notice: Subject to any disclaimer, the term of this patent is extended or adjusted under 35 U.S.C. 154(b) by 259 days.

(21) Appl. No.: 15/059,928

(22) Filed: Mar. 3, 2016

(65) Prior Publication Data

US 2016/0281836 A1 Sep. 29, 2016

(30) Foreign Application Priority Data

Mar. 27, 2015 (JP) ................. 2015-066754

(51) Int. Cl.
*F16H 57/04* (2010.01)
*F16H 57/08* (2006.01)
*F16H 3/66* (2006.01)

(52) U.S. Cl.
CPC ....... *F16H 57/043* (2013.01); *F16H 57/0471* (2013.01); *F16H 57/0479* (2013.01); *F16H 57/0484* (2013.01); *F16H 57/082* (2013.01); *F16H 3/663* (2013.01); *F16H 2200/006* (2013.01); *F16H 2200/2012* (2013.01); *F16H 2200/2023* (2013.01); *F16H 2200/2043* (2013.01)

(58) Field of Classification Search
CPC ............... F16H 57/043; F16H 57/0482; F16H 57/0484; F16H 57/0486; F16H 57/0479; F16H 57/082
See application file for complete search history.

(56) References Cited

U.S. PATENT DOCUMENTS 9,695,929 B2 * 7/2017 Miyoshi ............. F16H 57/0426

FOREIGN PATENT DOCUMENTS

JP 2004183705 A 7/2004

* cited by examiner

*Primary Examiner* — Erin D Bishop
(74) *Attorney, Agent, or Firm* — Alleman Hall Creasman & Tuttle LLP

(57) ABSTRACT

An automatic transmission is provided, which includes a double-sun-gear-type planetary gear set including coaxial first and second sun gears, a ring gear, a pinion meshed with the sun gears and the ring gear, and a carrier supporting the pinion and having a pinion shaft and a carrier body. The carrier body includes first and second plates supporting the pinion shaft, a coupling part coupling the first and second plates, and a center plate extending inward in radial directions of the gear set from the coupling part by passing between the sun gears, and coupled to a rotational member. An inlet port is formed at an inner circumferential end of the center plate, and a center plate oil path extends radially outward from the inlet port. A lubricant oil supply path communicates with a bearing from the inlet port through the center plate oil path.

6 Claims, 7 Drawing Sheets

|  | CL1 | CL2 | CL3 | BR1 | BR2 |
|---|---|---|---|---|---|
| 1ST GEAR | ○ |  |  | ○ | ○ |
| 2ND GEAR |  | ○ |  | ○ | ○ |
| 3RD GEAR | ○ | ○ |  |  | ○ |
| 4TH GEAR |  | ○ | ○ |  | ○ |
| 5TH GEAR | ○ |  | ○ |  | ○ |
| 6TH GEAR | ○ | ○ | ○ |  |  |
| 7TH GEAR | ○ |  | ○ | ○ |  |
| 8TH GEAR |  | ○ | ○ | ○ |  |
| REVERSE GEAR |  |  | ○ | ○ | ○ |

FIG. 2

AUTOMATIC TRANSMISSION

BACKGROUND

The present invention relates to an automatic transmission to be mounted on a vehicle.

Generally, automatic transmissions mounted on vehicles include a transmission mechanism having a plurality of planetary gear sets (planetary gear mechanisms) and a plurality of friction fastening elements, such as clutches and brakes. Such an automatic transmission selectively fastens one or more of the friction fastening elements to switch a power transmission path among a plurality of paths which pass through the planetary gear sets, respectively, so as to achieve a predetermined gear position corresponding to an operating state of the vehicle.

For example, JP2004-183705A discloses an automatic transmission including three single-pinion-type planetary gear sets and five friction fastening elements, for achieving six forward gear positions and one reverse gear position by fastening two of the friction fastening elements.

Further, in terms of a configuration of the power transmission path, an automatic transmission is known, which includes a double-sun-gear-type planetary gear set in which a sun gear is divided, in axial directions thereof, into first and second sun gears, and a carrier body supporting a pinion shaft of a carrier is coupled, by passing between the first and second sun gears, to a rotational member disposed on an inner circumferential side of the first and second sun gears.

As illustrated in FIG. 7, with the automatic transmission 110 disclosed in JP2004-183705A, a double-sun-gear-type planetary gear set 120 is disposed on a counter-drive-source side inside a transmission case 111, and the planetary gear set 120 has coaxial first and second sun gears 121 and 122, a ring gear 123, a pinion 124 meshed with the first and second sun gears 121 and 122 and the ring gear 123, and a carrier 125 supporting the pinion 124.

The carrier 125 has a pinion shaft 126 rotatably supporting the pinion 124, and a carrier body 127 supporting both end parts of the pinion shaft 126. The carrier body 127 is provided with a power transmitting part 127a extending inward in radial directions of the planetary gear set 120 by passing between the first and second sun gears 121 and 122.

With the planetary gear set 120, the first sun gear 121 is coupled, via a power transmitting member 132, to a brake hub 131 of a brake 130 disposed on an outer circumferential side of the planetary gear set 120, the second sun gear 122 is coupled to a sun gear 141 of a planetary gear set 140 disposed on a drive source side of the planetary gear set 120, the carrier 125 is coupled, via the power transmitting part 127a, to a center shaft 142 disposed on an inner circumferential side of the first and second sun gears 121 and 122, and the center shaft 142 is coupled to a clutch disposed on the drive source side of the planetary gear set 140. Note that the reference numerals used here to describe the automatic transmission disclosed in JP2004-183705A are not in correspondence with those in JP2004-183705A.

Meanwhile, in such an automatic transmission including a double-sun-gear-type planetary gear set, a pinion constituting the double-sun-gear-type planetary gear set has a smaller diameter than a sun gear and a ring gear and rotates at high speed, and therefore, a sufficient amount of lubricant oil needs to be supplied to bearings, such as needle bearings, provided between the pinion and the pinion shaft, in order to secure high performance, durability, etc.

When supplying the lubricant oil to the bearings provided between the pinion and the pinion shaft, generally, the lubricant oil is supplied from an oil supply hole formed on a side of a central axis of the transmission mechanism, to spread to a space therearound by a centrifugal force, then is captured on an outer circumferential side of the space to be introduced into an oil path inside the pinion shaft, and guided, from the oil path, to the bearings which are on an outer circumferential side of the pinion shaft.

Also in the planetary gear set 120 in FIG. 7, an oil supply hole 121a is formed in a part of the first sun gear 121 on the counter-drive-source side. As indicated by a lubricant oil supply path L11, lubricant oil is spread from the oil supply hole 121a to a space 128 formed therearound, is captured on an outer circumferential side of the space 128 to be introduced into a carrier body oil path 127b, and is supplied, through a pinion shaft oil path 126a, to bearings 129 provided between the pinion 124 and the pinion shaft 126.

However, after the lubricant oil from the oil supply hole 121a is supplied to the space 128 inside the transmission case 111, only a portion of the lubricant oil is introduced into the carrier body oil path 127b to be supplied to the bearings 129, which lowers lubricant oil supply efficiency. Therefore, to supply a predetermined amount of lubricant oil to the bearings 129, a supply amount of the lubricant oil needs to be increased, which may cause a size increase of an oil pump, an increase of driving loss, etc.

SUMMARY

The present invention is made in view of the above situations and aims to provide an automatic transmission, which includes a double-sun-gear-type planetary gear set and is capable of efficiently supplying lubricant oil to bearings provided between a pinion and a pinion shaft of the planetary gear set.

An automatic transmission includes a double-sun-gear-type planetary gear set, the double-sun-gear-type planetary gear set including coaxial first and second sun gears, a ring gear, a pinion meshed with the first and second sun gears and the ring gear, and a carrier supporting the pinion and having a pinion shaft and a carrier body supporting the pinion shaft. The carrier body includes first and second plates supporting both end parts of the pinion shaft, a coupling part coupling the first plate to the second plate, and a center plate extending inward in radial directions of the planetary gear set from the coupling part by passing between the first and second sun gears, and coupled to a predetermined rotational member. An inlet port is formed at an inner circumferential end of the center plate, and a center plate oil path is formed inside the center plate to extend radially outward from the inlet port. A lubricant oil supply path through which lubricant oil is supplied to a bearing provided between the pinion and the pinion shaft is formed to communicate with the bearing from the inlet port through the center plate oil path.

With the above configuration, in the automatic transmission including the double-sun-gear-type planetary gear set, the carrier body includes the first and second plates supporting both end parts of the pinion shaft, the coupling part coupling the first plate to the second plate, and the center plate extending inward in radial directions of the planetary gear set from the coupling part by passing between the first and second sun gears, and coupled to the predetermined rotational member. The center plate oil path is formed inside the center plate to extend radially outward from the inlet port.

Further, the lubricant oil supply path through which the lubricant oil is supplied to the bearing provided between the pinion and the pinion shaft communicates with the bearing from the inlet port through the center plate oil path. Therefore, the inlet port of the lubricant oil supply path can be formed at the inner circumferential (axial side) end of the center plate. The spread of the lubricant oil supplied from the axial side can be suppressed, and the lubricant oil can efficiently be supplied to the bearing provided between the pinion and the pinion shaft of the double-sun-gear-type planetary gear set.

A pinion shaft oil path may be formed inside the pinion shaft to extend in axial directions of the planetary gear set. A coupling part oil path may be formed inside the coupling part to communicate with the center plate oil path and extend in one of the axial directions from the center plate oil path. The lubricant oil supply path may communicate with the pinion shaft oil path at an end part of the pinion shaft via the center plate oil path and the coupling part oil path from the inlet port, so as to communicate with the bearing through the pinion shaft oil path.

With the above configuration, the pinion shaft oil path is formed inside the pinion shaft to extend in the axial directions. The coupling part oil path is formed inside the coupling part to communicate with the center plate oil path and extends in one of the axial directions. The lubricant oil supply oil path communicates with the pinion shaft oil path at the end part of the pinion shaft via the center plate oil path and the coupling part oil path from the inlet port, so as to communicate with the bearing through the pinion shaft oil path. Thus, the lubricant oil supply path can be formed into a closed passage with a comparatively simple structure. Therefore, the above effects can effectively be obtained.

A to-be-lubricated part may be provided near the planetary gear set. The carrier may supply a portion of the lubricant oil introduced from the inlet port, to the to-be-lubricated part.

With the above configuration, since the carrier supplies, to the to-be-lubricated part provided near the planetary gear set, the portion of the lubricant oil introduced from the inlet port, the lubricant oil introduced from the inlet port can be supplied to the bearing provided between the pinion and the pinion shaft, as well as to the to-be-lubricated part.

The carrier may be formed with, at an outer circumferential position of the first plate, a supply port communicating with the center plate oil path and through which the lubricant oil is supplied to the to-be-lubricated part, and the carrier may supply the portion of the lubricant oil introduced from the inlet port to the to-be-lubricated part, through the supply port.

With the above configuration, the carrier is formed with, at the outer circumferential position of the first plate, the supply port communicating with the center plate oil path and through which the lubricant oil is supplied to the to-be-lubricated part, and the carrier supplies the portion of the lubricant oil introduced from the inlet port to the to-be-lubricated part through the supply port. Therefore, the above effects can particularly be realized.

BRIEF DESCRIPTION OF THE DRAWINGS

FIG. 2 is a fastening combination table of friction fastening elements of the automatic transmission.

DETAILED DESCRIPTION OF THE EMBODIMENTS

Hereinafter, embodiments of the present invention are described in detail with reference to the accompanying drawings.

Figure 1:
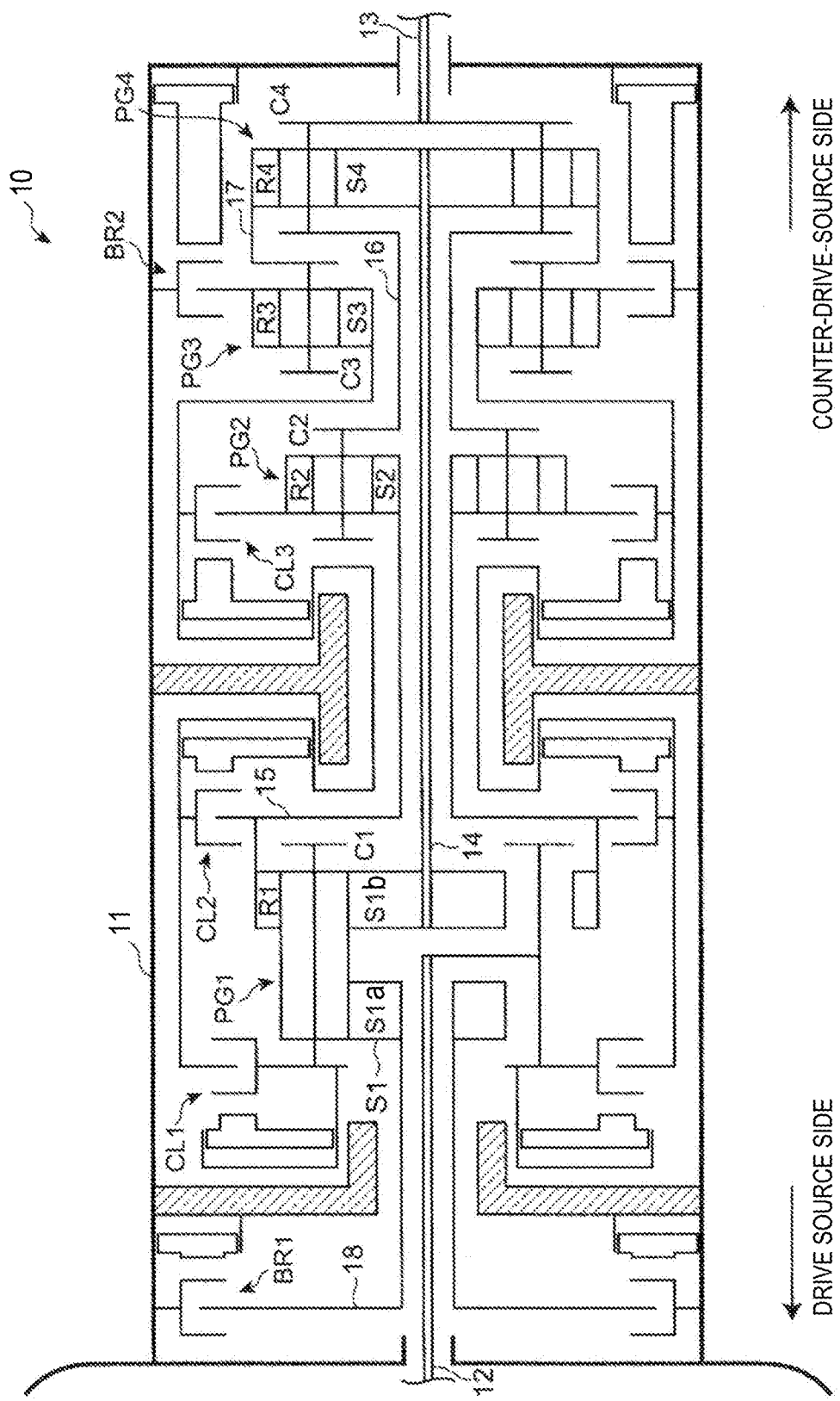
FIG. 1 is a substantial view of an automatic transmission according to a first embodiment of the present invention.

FIG. 1 is a substantial view of a configuration of an automatic transmission 10 according to a first embodiment of the present invention. The automatic transmission 10 includes, in a transmission case 11, an input shaft 12 (input member) disposed on a drive source side (left side in FIG. 1), and an output shaft 13 (output member) disposed on a counter-drive-source side (right side in FIG. 1). The automatic transmission 10 is a longitudinal installation type for, for example, a front-engine rear-drive vehicle in which the input and output shafts 12 and 13 are disposed coaxially.

On axes of the input and output shafts 12 and 13, a first planetary gear set PG1, a second planetary gear set PG2, a third planetary gear set PG3, and a fourth planetary gear set PG4 (hereinafter, simply referred to as the "first to fourth gear sets PG1 to PG4") are disposed in this order from the drive source side.

Further, a first clutch CL1 is disposed on the drive source side of the first gear set PG1, and second and third clutches CL2 and CL3 are disposed on the counter-drive-source side of the first gear set PG1 in this order from the drive source side. The first clutch CL1 is disposed near the first gear set PG1, on the drive source side and an outer circumferential side of the first gear set PG1. The second clutch CL2 is disposed near the first gear set PG1, on the counter-drive-source side and the outer circumferential side of the first gear set PG1. The third clutch CL3 is disposed near the second gear set PG2, on an outer circumferential side thereof. A first brake BR1 is disposed on the drive source side of the first clutch CL1 and a second brake BR2 is disposed on the counter-drive-source side of the third clutch CL3.

Each of the first to fourth gear sets PG1 to PG4 is a single pinion type in which a pinion supported by a carrier is directly meshed with a sun gear and a ring gear, and has, as rotational elements, sun gears S1 to S4, ring gears R1 to R4, and carriers C1 to C4.

The first gear set PG1 is a double sun gear type in which the sun gear S1 is divided, in axial directions of the first gear set PG1, into a first sun gear S1$a$ on the drive source side and a second sun gear S1$b$ on the counter-drive-source side. The first and second sun gears S1$a$ and S1$b$ have the same number of teeth and are meshed with the same pinion(s) supported by the carrier C1. Thus, the first and second sun gears S1$a$ and S1$b$ rotate in constant synchronization with each other.

Further, the sun gear S1 of the first gear set PG1, specifically, the second sun gear S1$b$, is always coupled to the sun gear S4 of the fourth gear set PG4 via a power transmitting member 14. The ring gear R1 of the first gear set PG1 is always coupled to the sun gear S2 of the second gear set PG2 via a power transmitting member 15, the carrier C2 of the second gear set PG2 is always coupled to the carrier C4 of the fourth gear set PG4 via a power transmitting member 16, and the carrier C3 of the third gear set PG3 is always coupled to the ring gear R4 of the fourth gear set PG4 via a power transmitting member 17.

The input shaft 12 is always coupled to the carrier C1 of the first gear set PG1 through a space between the first and second sun gears S1a and S1b. The output shaft 13 is always coupled to the carrier C4 of the fourth gear set PG4.

The first clutch CL1 is disposed on a power transmission path of the input shaft 12 and the carrier C1 of the first gear set PG1 to the sun gear S3 of the third gear set PG3, and disconnects the input shaft 12 and the carrier C1 from the sun gear S3. The second clutch CL2 is disposed on a power transmission path of the ring gear R1 of the first gear set PG1 and the sun gear S2 of the second gear set PG2 to the sun gear S3 of the third gear set PG3, and disconnects the ring gear R1 and the sun gear S2 from the sun gear S3. The third clutch CL3 is disposed on a power transmission path between the ring gear R2 of the second gear set PG2 and the sun gear S3 of the third gear set PG3, and disconnects them from each other.

Further, the first brake BR1 is disposed between the transmission case 11 and the sun gear S1 of the first gear set PG1, specifically, the first sun gear S1a, and disconnects them from each other. The second brake BR2 is disposed between the transmission case 11 and the ring gear R3 of the third gear set PG3, and disconnects them from each other.

With the above configuration, as illustrated in FIG. 2, the automatic transmission 10 forms first to eighth gear positions in a D-range and a reverse gear position in an R-range based on combination of a fastening state among the first to third clutches CL1 to CL3 and the first and second brakes BR1 and BR2.

Figure 3:
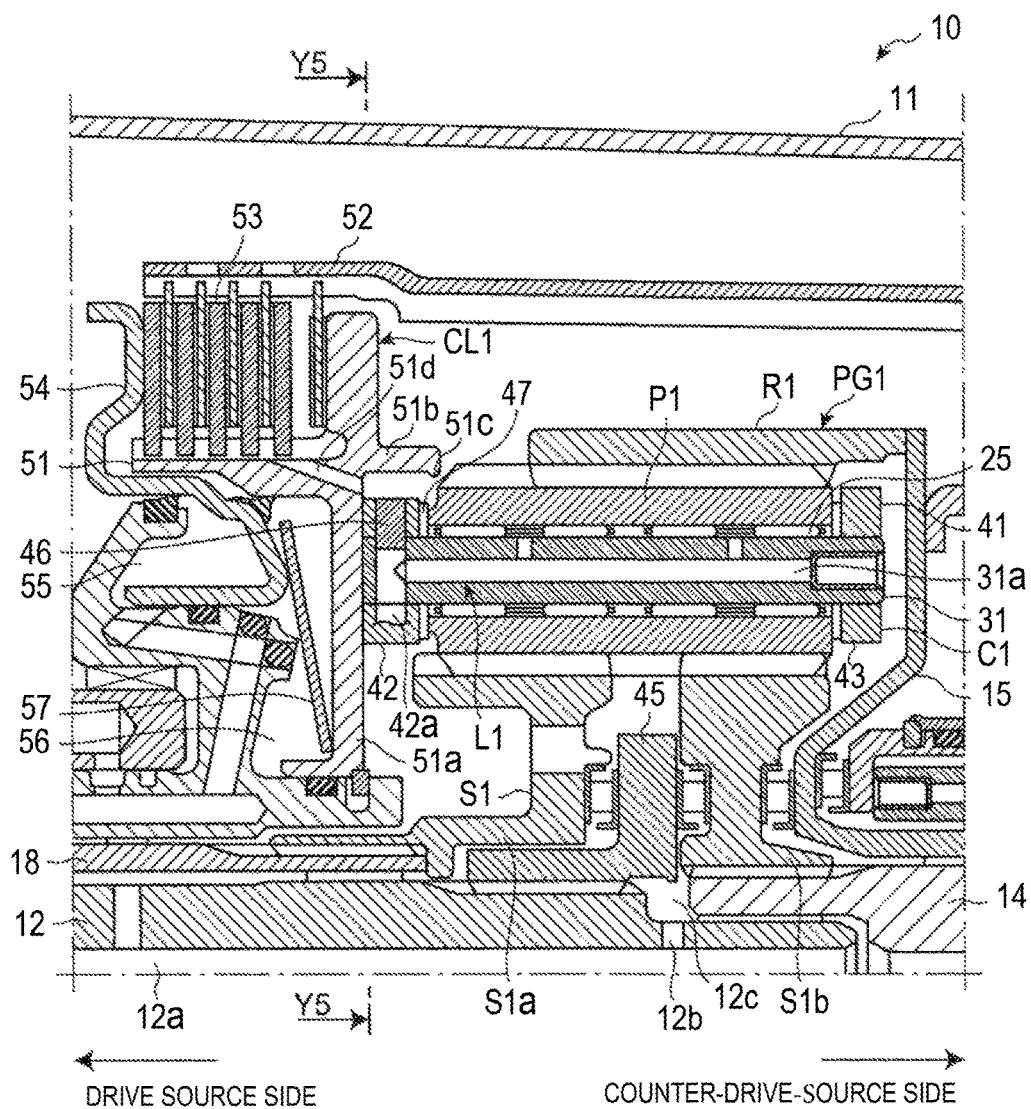
FIG. 3 is a cross-sectional view of a first gear set of the automatic transmission and parts therearound.
Figure 4:
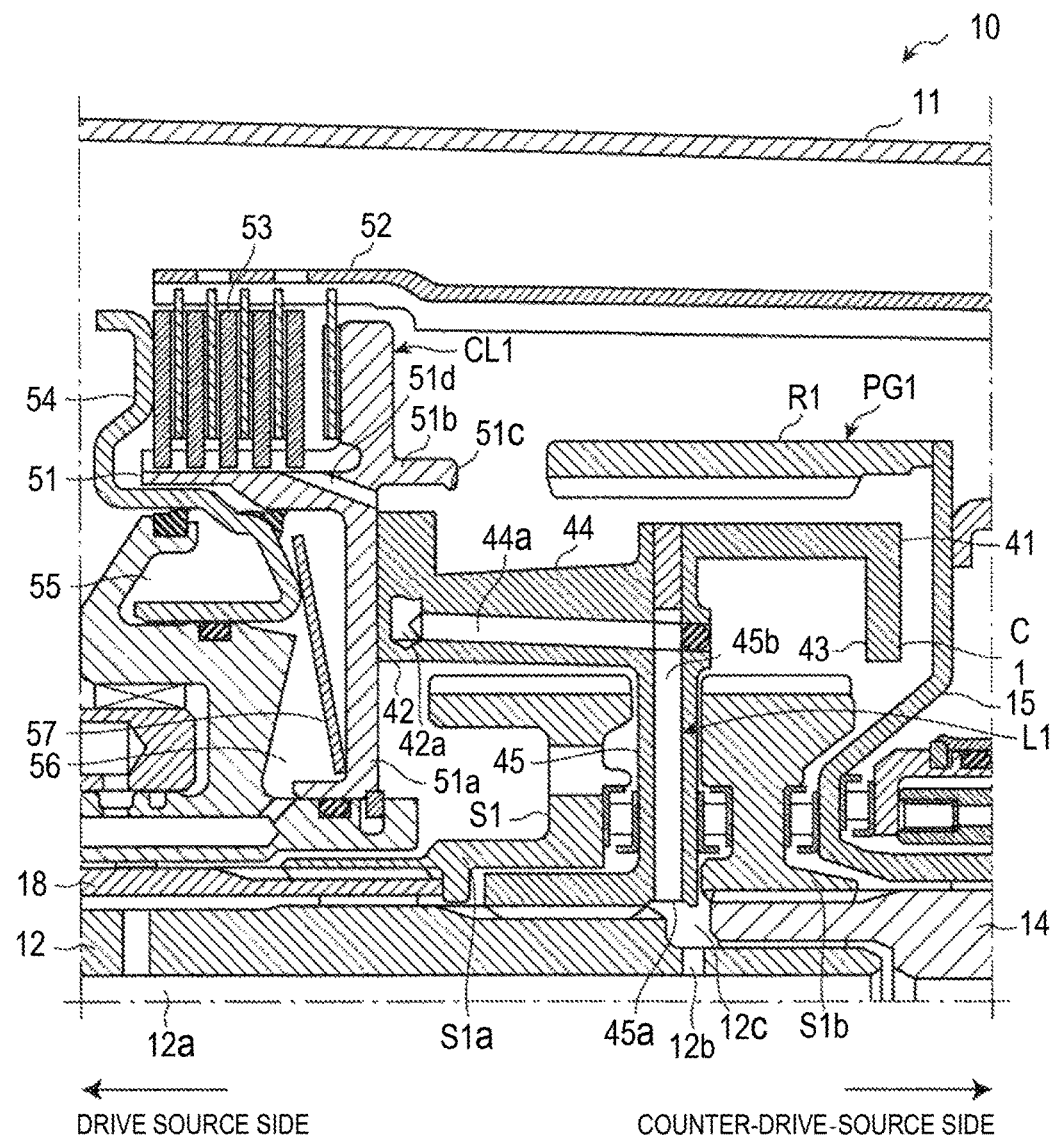
FIG. 4 is another cross-sectional view of the first gear set of the automatic transmission and parts therearound.
Figure 5:
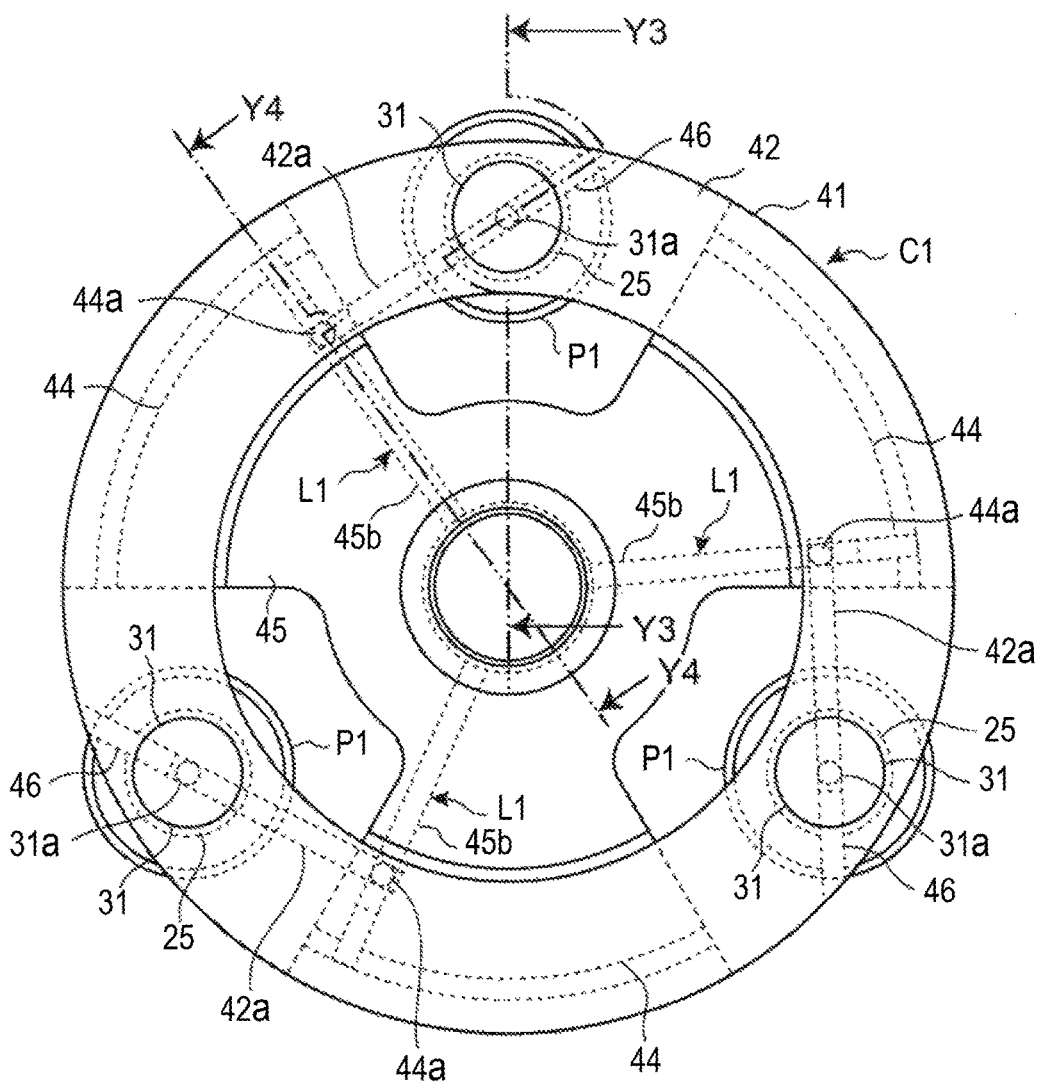
FIG. 5 is a view illustrating lubricant oil supply paths to bearings, each of which are provided between a pinion and a pinion shaft of the first gear set.

Next, the first gear set PG1 which is the double-sun-gear-type planetary gear set of the automatic transmission of this embodiment is described more in detail with reference to FIGS. 3 to 5.

FIG. 3 is a cross-sectional view of the first gear set of the automatic transmission and parts therearound. FIG. 4 is another cross-sectional view of the first gear set of the automatic transmission and parts therearound. FIG. 5 is a view illustrating lubricant oil supply paths to bearings, each of which are provided between a pinion and a pinion shaft of the first gear set, and schematically illustrating the carriers and the pinions of the first gear set of the automatic transmission seen in a direction Y5-Y5 in FIG. 3. Note that FIGS. 3 and 4 correspond to cross sections taken along lines Y3-Y3 and Y4-Y4 in FIG. 5, respectively. Note that, although the pinion may be described below as if only one pinion is provided for the first gear set PG1, the number of pinions is arbitrary, and numbers of other components accordingly provided (pinion shaft, lubricant oil supply path, bearing, etc., described later) are determined based on the number of the pinions. In this embodiment, three pinions are provided.

As illustrated in FIGS. 3 and 4, the first gear set PG1 has the coaxial sun gears (the first sun gear S1a on the drive source side and the second sun gear S1b on the counter-drive-source side), the ring gear R1, the pinion P1 meshed with the first and second sun gears S1a and S1b and the ring gear R1, and the carrier C1 supporting the pinion P1.

The carrier C1 has the pinion shaft 31 rotatably supporting the pinion P1 via the bearings 25 (e.g., needle bearings), and a carrier body 41 supporting the pinion shaft 31 at both end parts of the pinion shaft 31.

The carrier body 41 includes a pair of first and second plates 42 and 43 supporting both of the end parts of the pinion shaft 31, a coupling part 44 coupling the first plate 42 to the second plate 43, and a center plate 45 extending inward in radial directions of the first gear set PG1 from the coupling part 44 by passing between the first and second gears S1a and S1b, and coupled to the input shaft 12 (rotational member). Note that the second plate 43 is provided on the counter-drive-source side of the first plate 42.

The coupling part 44 extends in the axial directions between the first and second plates 42 and 43 and is disposed on one side of the pinion shaft 31 in the circumferential direction. The carrier body 41 is coupled to the pinion shaft 31 to rotate integrally therewith via a circular-column-shaped pin member 46 extending radially. The pin member 46 functions as a positioning pin for positioning the carrier body 41 and the pinion shaft 31 and also as a plug fitted into an end of a first plate oil path 42a described later.

Further in the first gear set PG1, the first sun gear S1a is coupled to a hub member 18 of the first brake BR1, the second sun gear S1b is coupled to the sun gear S4 of the fourth gear set PG4 via the power transmitting member 14, the ring gear R1 is coupled to the sun gear S2 of the second gear set PG2 via the power transmitting member 15, and the carrier C1 is coupled to the input shaft 12.

Further, the carrier C1, specifically the first plate 42 of the carrier C1, is coupled to a hub member 51 of the first clutch CL1 disposed near the first gear set PG1.

The first clutch CL1 includes a plurality of friction plates 53 disposed between the hub member 51 and a drum member 52, a piston 54 for pressing the plurality of friction plates 53, and an oil pressure chamber 55 into which oil pressure is applied to bias the piston 54 from the drive source side toward the friction plates.

The first clutch CL1 has, on an opposite side from the oil pressure chamber 55 with respect to the piston 54, a centrifugal cancelling chamber 56 into which operational oil is supplied to bias the piston 54 toward a direction opposite from the friction plates. The centrifugal cancelling chamber 56 is provided therein with a return spring 57 for biasing the piston 54 to the direction opposite from the friction plates.

Next, a lubricant oil supply path L1 through which lubricant oil is supplied to the bearings 25 provided between the pinion P1 and the pinion shaft 31 of the first gear set PG1 is described.

In the automatic transmission 10, an oil path 12a is formed inside the input shaft 12 to extend in the axial directions, and the oil path 12a is provided with, on an inner circumferential side of the center plate 45 of the carrier body 41, an oil supply hole 12b for guiding the lubricant oil radially outward through an outer circumferential surface of the input shaft 12.

The input shaft 12 is spline fitted to the carrier C1 to rotate in synchronization therewith. Between the input shaft 12 and the carrier C1, specifically the center plate 45, an oil accumulating section 12c opening to the oil supply hole 12b is provided. An inlet port 45a opening to the oil accumulating section 12c is formed at an inner circumferential end of the center plate 45 of the carrier C1.

The lubricant oil is introduced from the oil path 12a of the input shaft 12, through the oil supply hole 12b and the oil accumulating section 12c, into the inlet port 45a, and is further supplied to the bearings 25 provided between the pinion P1 and the pinion shaft 31 of the first gear set PG1.

The lubricant oil supply path L1 to the bearings 25 of the first gear set PG1 includes a center plate oil path 45b extending radially outward inside the center plate 45 from the inlet port 45a, a coupling part oil path 44a communicating with the center plate oil path 45b and extending inside the coupling part 44 from the center plate oil path 45b to the drive source side, the first plate oil path 42a communicating with the coupling part oil path 44a and extending inside the first plate 42 in the circumferential direction from the coupling part oil path 44a, and a pinion shaft oil path 31a communicating with the first plate oil path 42a at an end part of the pinion shaft 31 on the drive source side, extending inside the pinion shaft 31 in the axial directions from the first plate oil path 42a to the counter-drive-source side, and communicating with an outer circumferential surface of the pinion shaft 31.

As illustrated in FIG. 5, the lubricant oil supply path L1 is disposed at a plurality of positions (three positions in this embodiment) at an even interval in the circumferential direction. The center plate oil path 45b of the lubricant oil supply path L1 radially extends inside the center plate 45 to communicate with the coupling part oil path 44a, and the first plate oil path 42a of the lubricant oil supply path L1 communicates with the coupling part oil path 44a and circumferentially extends to communicate with the pinion shaft oil path 31a.

Thus, in the automatic transmission 10, each lubricant oil supply path L1 through which the lubricant oil is supplied to the bearings 25 provided between the pinion P1 and the pinion shaft 31 of the first gear set PG1 communicates with the bearings 25 via the center plate oil path 45b from the inlet port 45a.

Further in the automatic transmission 10, the carrier C1 of the first gear set PG1 supplies a portion of the lubricant oil introduced from the inlet port 45a, to the first clutch CL1 provided near the first gear set PG1 as a to-be-lubricated part, specifically the friction plates 53.

The hub member 51 of the first clutch CL1 has a flange part 51a extending radially inward from the counter-drive-source side of a spline part to which the friction plates 53 are engaged, and the carrier C1, specifically the first plate 42, is coupled to the flange part 51a. The hub member 51 also has an extension part 51b extending to the counter-drive-source side from the flange part 51a, and the extension part 51b is provided to cover the outer circumferential side of the first plate 42 of the carrier C1. A tip of the extension part 51b on the counter-drive-source side is provided with a rib part 51c projecting radially inward. Further, the hub member 51 is formed with a communicating oil path 51d communicating space formed between the first plate 42 and the extension part 51b, with an outer circumferential surface of the spline part of the hub member 51.

Thus, the carrier C1 supplies the lubricant oil introduced from the inlet port 45a to the bearings 25 via the center plate oil path 45b, and additionally, when the lubricant oil flows out from the bearings 25 to the outer circumferential side thereof through a gap caused by a washer 47 provided between the first plate 42 and the pinion P1, the carrier C1 receives the lubricant oil at the outer circumferential side and supplies it to the friction plates 53 of the first clutch CL1 via the communicating oil path 51d.

As described above, in the automatic transmission 10 including the first gear set PG1 of this embodiment, the carrier body 41 is provided with the first and second plates 42 and 43, the coupling part 44, the center plate 45 extending radially inward from the coupling part 44 by passing between the first and second sun gears S1a and S1b, and coupled to the input shaft 12. Further, the center plate 45 is formed with the center plate oil path 45b extending radially outward from the inlet port 45a formed at the inner circumferential end of the center plate 45.

The lubricant oil supply path L1 through which the lubricant oil is supplied to the bearings 25 provided between the pinion P1 and the pinion shaft 31 communicates with the bearings 25 via the center plate oil path 45b from the inlet port 45a.

Thus, the inlet port 45a of the lubricant oil supply path L1 can be formed at the inner circumferential (axial side) end of the center plate 45. Therefore, the spread of the lubricant oil supplied from the axial side can be suppressed, and the lubricant oil can efficiently be supplied to the bearings 25 provided between the pinion P1 and the pinion shaft 31 of the double-sun-gear-type planetary gear set PG1.

Further, the pinion shaft oil path 31a is formed inside the pinion shaft 31 to extend in the axial directions. The coupling part oil path 44a is formed inside the coupling part 44 to communicate with the center plate oil path 45b and extend in one of the axial directions. The lubricant oil supply path L1 communicates with the pinion shaft oil path 31a at the end part of the pinion shaft 31 via the center plate oil path 45b and the coupling part oil path 44a from the inlet port 45a formed at the inner circumferential end of the center plate 45, so as to communicate with the bearings 25 through the pinion shaft oil path 31a. Thus, the lubricant oil supply path L1 can be formed into a closed passage with a comparatively simple structure, and the lubricant oil can efficiently be supplied to the bearings 25.

Further, since the carrier C1 supplies, to the to-be-lubricated part CL1 provided near the first gear set PG1, the portion of the lubricant oil introduced from the inlet port 45a formed at the inner circumferential end of the center plate 45, the lubricant oil introduced from the inlet port 45a can be supplied to the bearings 25 provided between the pinion P1 and the pinion shaft 31, as well as to the to-be-lubricated part CL1.

Figure 6:
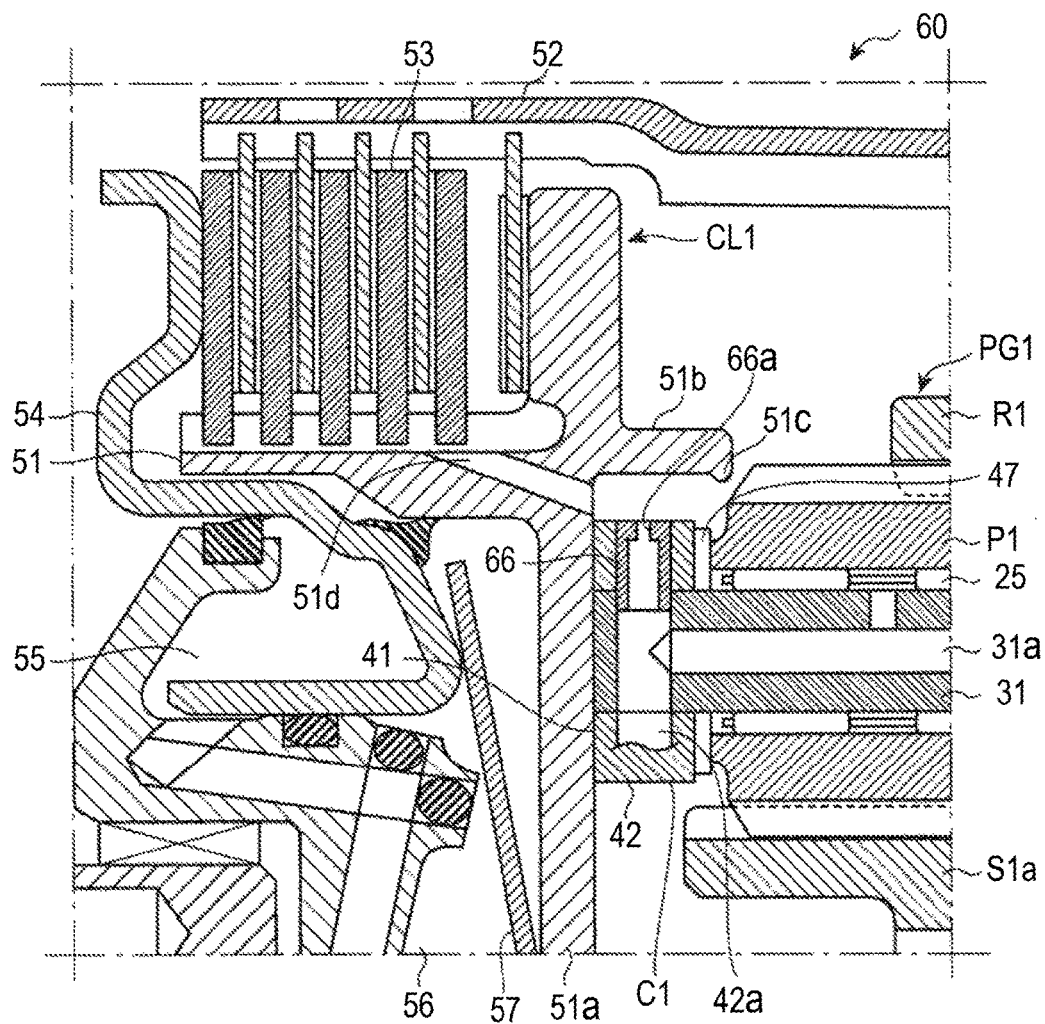
FIG. 6 is a cross-sectional view of a first gear set of an automatic transmission and parts therearound according to a second embodiment of the present invention.
Figure 7:
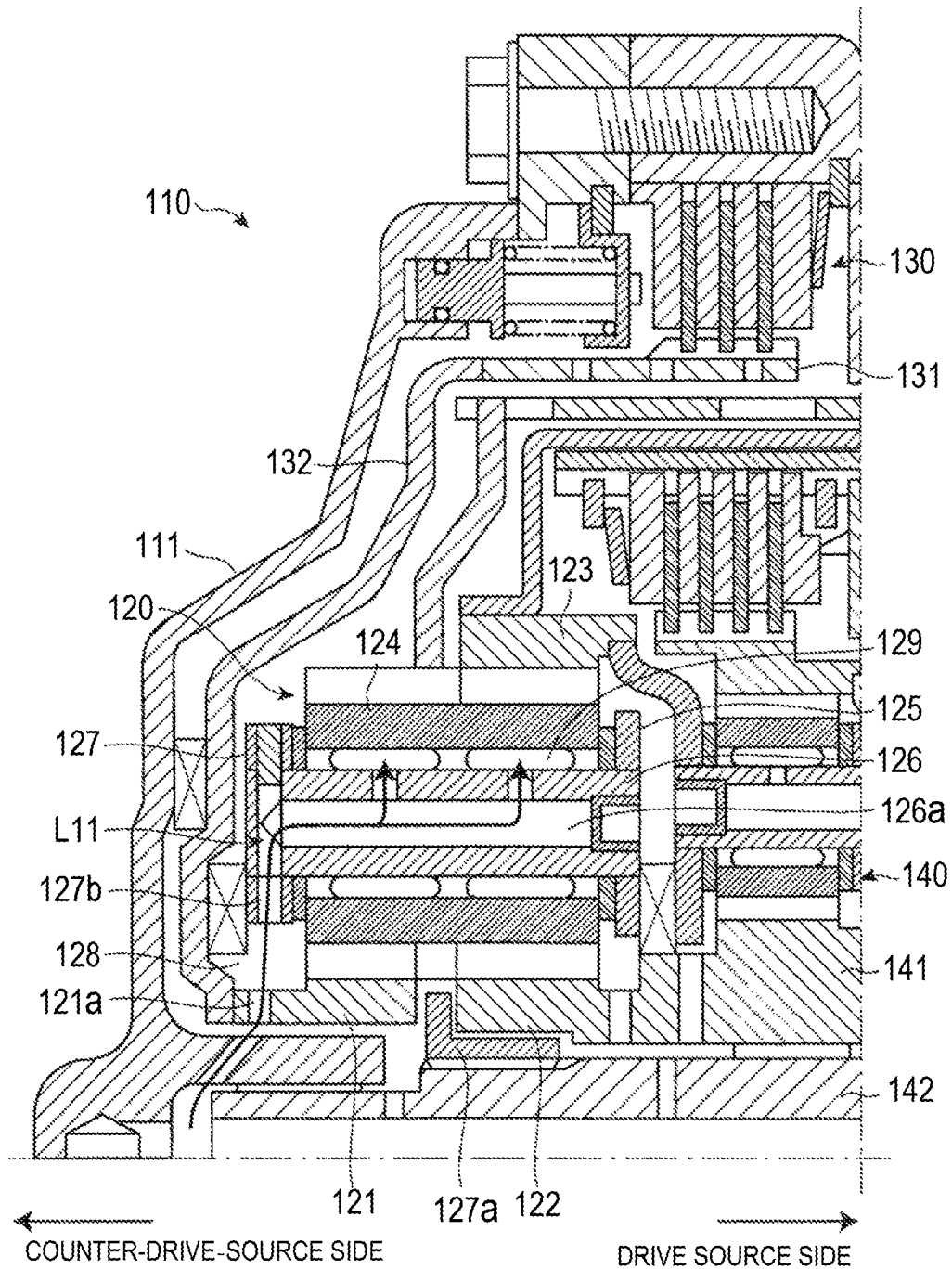
FIG. 7 is a cross-sectional view illustrating an automatic transmission of a conventional example.

FIG. 6 is a cross-sectional view of a first gear set of an automatic transmission and parts therearound according to a second embodiment of the present invention. The automatic transmission 60 of the second embodiment is similar to the automatic transmission 10 of the first embodiment, except that a supply port through which lubricant oil is supplied to the first clutch CL1 is formed inside a pin member. Therefore, description of the similar configurations is omitted.

As illustrated in FIG. 6, also in the automatic transmission 60 of the second embodiment, a pin member 66 is attached to the carrier body 41 to extend radially, and the carrier body 41 is coupled to the pinion shaft 31 to rotate integrally therewith via the pin member 66. In the automatic transmission 60, the pin member 66 is formed with a supply port 66a communicating with the center plate oil path 45b via the coupling part oil path 44a and the first plate oil path 42a and through which the lubricant oil is supplied to the first clutch CL1.

The pin member 66 is formed into a circular cylinder having a bottom part on the outer circumferential side thereof, and the supply port 66a radially opens at the bottom part. Also in this embodiment, the pin member 66 functions as a positioning pin for positioning the carrier body 41 and the pinion shaft 31 and also as a plug fitted into an end of the first plate oil path 42a.

Thus, the carrier C1 supplies the lubricant oil introduced from the inlet port 45a to the bearings 25 via the center plate oil path 45b, and additionally, when lubricant oil flows out to the outer circumferential side of the bearings 25 from the supply port 66a, the carrier C1 receives the lubricant oil at the outer circumferential side and supplies it to the friction plates 53 of the first clutch CL1 via the communicating oil path 51d.

Further, similar to the automatic transmission 10 of the first embodiment, when lubricant oil flows out from the bearings 25 to the outer circumferential side thereof through the gap caused by the washer 47 provided between the first plate 42 and the pinion P1, the carrier C1 receives the lubricant oil at the outer circumferential side and supplies it to the friction plates 53 of the first clutch CL1 via the communicating oil path 51d.

As described above, also in the automatic transmission 60 including the first gear set PG1 of this embodiment, the lubricant oil supply path L1 through which the lubricant oil is supplied to the bearings 25 provided between the pinion P1 and the pinion shaft 31 communicates with the bearings 25 via the center plate oil path 45b from the inlet port 45a formed at the inner circumferential end of the center plate 45. Therefore, the lubricant oil can efficiently be supplied to the bearings 25 provided between the pinion P1 and the pinion shaft 31 of the double-sun-gear-type planetary gear set PG1.

Further, since the carrier C1 supplies, to the to-be-lubricated part CL1 provided near the first gear set PG1, the portion of the lubricant oil introduced from the inlet port 45a formed at the inner circumferential end of the center plate 45, the lubricant oil introduced from the inlet port 45a can be supplied to the bearings 25 provided between the pinion P1 and the pinion shaft 31, as well as to the to-be-lubricated part CL1.

Note that in this embodiment, the pin member 66 functions as the positioning pin for positioning the carrier body 41 and the pinion shaft 31 and also as the plug fitted into the end of the first plate oil path 42a; however, alternatively, the positioning pin and the plug may be provided separately.

The present invention is not limited to the embodiments described above as examples, and may be variously enhanced and/or modified in design, without deviating from the scope of the present invention.

As described above, according to the present invention, in an automatic transmission including a double-sun-gear-type planetary gear set, lubricant oil can efficiently be supplied to bearings provided between a pinion and a pinion shaft. Thus, the present invention may suitably be utilized in a manufacturing industrial field of this type of automatic transmission and vehicles on which this type of automatic transmission is mounted.

It should be understood that the embodiments herein are illustrative and not restrictive, since the scope of the invention is defined by the appended claims rather than by the description preceding them, and all changes that fall within metes and bounds of the claims, or equivalence of such metes and bounds thereof, are therefore intended to be embraced by the claims.

LIST OF REFERENCE CHARACTERS 10, 60 Automatic Transmission
12 Input Shaft
25 Bearing
31 Pinion Shaft
31a Pinion Shaft Oil Path
41 Carrier Body
42 First Plate
42a First Plate Oil Path
43 Second Plate
44 Coupling Part
44a Coupling Part Oil Path
45 Center Plate
45a Inlet Port
45b Center Plate Oil Path
46, 66 Pin Member
66a Supply Port
C1, C2, C3, C4 Carrier
CL1, CL2 Clutch
L1 Lubricant Oil Supply Path
P1 Pinion
PG1, PG2, PG3, PG4 Planetary Gear Set
R1, R2, R3, R4 Ring Gear
S1, S2, S3, S4 Sun Gear
S1a First Sun Gear
S1b Second Sun Gear

The invention claimed is:

1. An automatic transmission comprising a double-sun-gear-type planetary gear set, the double-sun-gear-type planetary gear set including:
coaxial first and second sun gears;
a ring gear;
a pinion meshed with the first and second sun gears and the ring gear; and
a carrier supporting the pinion and having a pinion shaft and a carrier body supporting the pinion shaft,
wherein the carrier body includes:
first and second plates supporting respective end parts of the pinion shaft;
a coupling part coupling the first plate to the second plate; and
a center plate extending inward in a radial direction of the planetary gear set from the coupling part by passing between the first and second sun gears, and coupled to a predetermined rotational member,
wherein an inlet port is formed at an inner circumferential end of the center plate, and a center plate oil path is formed inside the center plate to extend radially outward from the inlet port, and
wherein a lubricant oil supply path through which lubricant oil is supplied to a bearing provided between the pinion and the pinion shaft is formed to communicate with the bearing from the inlet port through the center plate oil path.

2. The automatic transmission of claim 1, wherein a pinion shaft oil path is formed inside the pinion shaft to extend in an axial direction of the planetary gear set,
wherein a coupling part oil path is formed inside the coupling part to communicate with the center plate oil path and extends in the axial direction from the center plate oil path, and
wherein the lubricant oil supply path communicates with the pinion shaft oil path at one of the end parts of the pinion shaft via the center plate oil path and the coupling part oil path from the inlet port, so as to communicate with the bearing through the pinion shaft oil path.

3. The automatic transmission of claim 2, wherein a to-be-lubricated part is provided near the planetary gear set, and
wherein the carrier supplies a portion of the lubricant oil introduced from the inlet port, to the to-be-lubricated part.

4. The automatic transmission of claim 3, wherein the carrier is formed with, at an outer circumferential position of the first plate, a supply port communicating with the center plate oil path and through which the lubricant oil is supplied to the to-be-lubricated part, and the carrier supplies the portion of the lubricant oil introduced from the inlet port to the to-be-lubricated part, through the supply port.

5. The automatic transmission of claim 1, wherein a to-be-lubricated part is provided near the planetary gear set, and wherein the carrier supplies a portion of the lubricant oil introduced from the inlet port, to the to-be-lubricated part.

6. The automatic transmission of claim 5, wherein the carrier is formed with, at an outer circumferential position of the first plate, a supply port communicating with the center plate oil path and through which the lubricant oil is supplied to the to-be-lubricated part, and the carrier supplies the portion of the lubricant oil introduced from the inlet port to the to-be-lubricated part, through the supply port.

* * * * *